(12) United States Patent
Richardson et al.

(10) Patent No.: US 7,143,713 B1
(45) Date of Patent: Dec. 5, 2006

(54) CARRIER FOR PERSONAL WATERCRAFT

(75) Inventors: Aubrey Richardson, 5601 Wenlock St., Los Angeles, CA (US) 90016; Hugo Perez, 16418 California Ave., Paramount, CA (US) 90723

(73) Assignees: Aubrey Richardson, Los Angeles, CA (US); Hugo Perez, Los Angeles, CA (US)

( * ) Notice: Subject to any disclaimer, the term of this patent is extended or adjusted under 35 U.S.C. 154(b) by 0 days.

(21) Appl. No.: 11/284,650

(22) Filed: Nov. 21, 2005

(51) Int. Cl.
*B60P 3/10* (2006.01)

(52) U.S. Cl. .................................. 114/344; 280/414.1
(58) Field of Classification Search ............... 114/344; 280/414.1, 414.2; 414/462
See application file for complete search history.

(56) References Cited

U.S. PATENT DOCUMENTS

| | | | |
|---|---|---|---|
| 2,571,361 A * | 10/1951 | Harmanson | 114/344 |
| 3,902,613 A | 9/1975 | Newland | |
| 3,970,203 A | 7/1976 | Watson, Jr. | |
| 4,406,477 A | 9/1983 | McDonald | |
| 4,420,165 A | 12/1983 | Goodin | |
| 4,469,346 A | 9/1984 | Low | |
| 4,705,289 A | 11/1987 | Weber | |
| 4,784,545 A | 11/1988 | Lawrence | |
| 4,880,250 A | 11/1989 | Cravens | |
| 4,932,830 A | 6/1990 | Woodburn | |
| 4,954,038 A | 9/1990 | Sheahan | |
| 5,016,893 A * | 5/1991 | Hart, Jr. | 280/414.2 |
| 5,249,910 A * | 10/1993 | Ball | 114/344 |
| 5,431,525 A | 7/1995 | Scott | |
| 5,468,115 A | 11/1995 | Alvis | |
| 5,590,997 A * | 1/1997 | Fredriksson et al. | 114/344 |
| 5,664,516 A | 9/1997 | Breeden | |
| 5,704,756 A | 1/1998 | Marteney | |
| 5,772,388 A | 6/1998 | Clark | |
| 5,863,173 A * | 1/1999 | Bremner | 280/414.1 |
| 5,899,656 A | 5/1999 | Rahe | |
| 6,217,053 B1 | 4/2001 | Forsythe | |
| 6,257,167 B1 | 7/2001 | Joaquim | |
| 6,289,837 B1 | 9/2001 | Stetzel | |

* cited by examiner

*Primary Examiner*—Lars A. Olson
(74) *Attorney, Agent, or Firm*—Kleinberg & Lerner, LLP

(57) ABSTRACT

A trailer for launching a boat and a personal watercraft includes a chassis. An elevated platform attached to the chassis supports a personal watercraft above the chassis. A boom assembly pivots relative to the chassis between stored and launch positions. The boom assembly also has an intermediate position above the watercraft. A boom winch controls pivoting of the boom assembly. A watercraft winch on the boom assembly has a cable extending to the watercraft. When the boom assembly is in its intermediate position, the watercraft winch raises the watercraft off the elevated platform. Then the boom winch pivots the boom assembly to the launch position in which the watercraft is in the water. The cables then are released from the watercraft. Thereafter the boat is launched conventionally from the trailer.

17 Claims, 5 Drawing Sheets

CARRIER FOR PERSONAL WATERCRAFT

BACKGROUND OF THE INVENTION

1. Field of the Invention

The present invention relates to a boat trailer that also can carry a personal watercraft with a standard boat.

2. General Background and State of the Art

Personal watercraft such as the Kawasaki Jet Ski®, Yamaha WaveRunner® and Seadoo® watercraft are fast and maneuverable and large enough to carry one or two persons. Many boaters who own traditional power boat also own personal watercraft. Having both types of watercraft allows some persons in a group to fish or water ski from the traditional boat while other use the personal watercraft for other activities. Some use the personal watercraft to ferry between boats on a lake or in a marina or to run errands.

Boat owners often store their boats away from water. Consequently, they must transport their boat to and from a lake, river or ocean. Most boats are transported on an open trailer pulled by a car, truck or SUV and launched into the water at a boat ramp.

Boat ramps are inclined sections of road that begin on the land and incline into the water. To launch the boat into the water, the user backs down the ramp and allows the trailer to enter the water. The boat is secured to the trailer by a winch and cable at the front of the trailer attached to the bow of the boat. The user lets the cable out so that the boat can move back along the trailer toward the water until the boat floats completely. The user then releases the cable from the boat, rewinds the cable and drives forward off the boat dock. The process is reversed to return the boat to the trailer.

An owner can transport and launch personal watercraft in the same way. However, some persons need to transport a conventional boat and a personal watercraft simultaneously. The state of the art teaches vehicle trailer that can hold a boat and another vehicle over or under the boat. See Modson, U.S. Pat. No. 3,970,203 (1976), McDonald, U.S. Pat. No. 4,406,477 (1983), Low, U.S. Pat. No. 4,469,346 (1984) and others. Breeden, U.S. Pat. No. 5,664,516 (1997) mounts a personal watercraft on a carrier that mounts to the stern of a powerboat. The watercraft appears to be launched into the water while the boat is also in the water. See also Stetzel, U.S. Pat. No. 6,289,837 (2001), which mounts a personal watercraft transversely on a platform extending from the stern of a boat.

INVENTION SUMMARY

One object of the present invention is to mount a personal watercraft on a trailer above a boat such that a user can remove the watercraft from the trailer and place the watercraft into the water while the trailer is positioned on a boat ramp. Another object of the present invention is to make such a trailer light weight and yet strong enough to support a boat and a personal watercraft and allow the watercraft to be removed from the boat and positioned into the water. Another object of the present invention is to make such a trailer safe.

The trailer of the present invention has a chassis with a front end that can attach to a land vehicle such as a car, truck or SUV. Wheels on the chassis allow the chassis to be towed. An elevated platform on the chassis extends above the chassis and has a surface for supporting a personal watercraft. The proximal end of a boom assembly attaches to the chassis. The boom assembly can pivot from a stowed position in which the boom is above the boat to a launch position in which the boom assembly extends beyond the boat.

A winch on the chassis has a cable that extends to the boom. When that cable is let out, the boom can pivot toward the launch position. Conversely, when the cable is withdrawn into the winch, the boom pivots back over the boat.

A second winch on the boom has a cable attached to the personal watercraft. When the boom is between the launch and stowed positions, cables from the second winch are attached to the watercraft. As the winch retracts the cable, the watercraft is lifted off the elevated platform. Then, the first cable is let out further to pivot the boom to its launch position. The cable on the second winch is let out to lower the watercraft into the water. Likewise, to recover the personal watercraft, the cable is reattached to the watercraft, the winch pulls in the cable to raise the watercraft out of the water. Then the first winch pulls the cable attached to the boom assembly to pivot the boom back over the boat. Then the second winch is let out slightly to lower the watercraft onto its elevated platform. The cables from the second winch are released from the watercraft, and the boom is pivoted to its stowed position.

DETAILED DESCRIPTION OF THE PREFERRED EMBODIMENTS

Figure 1:
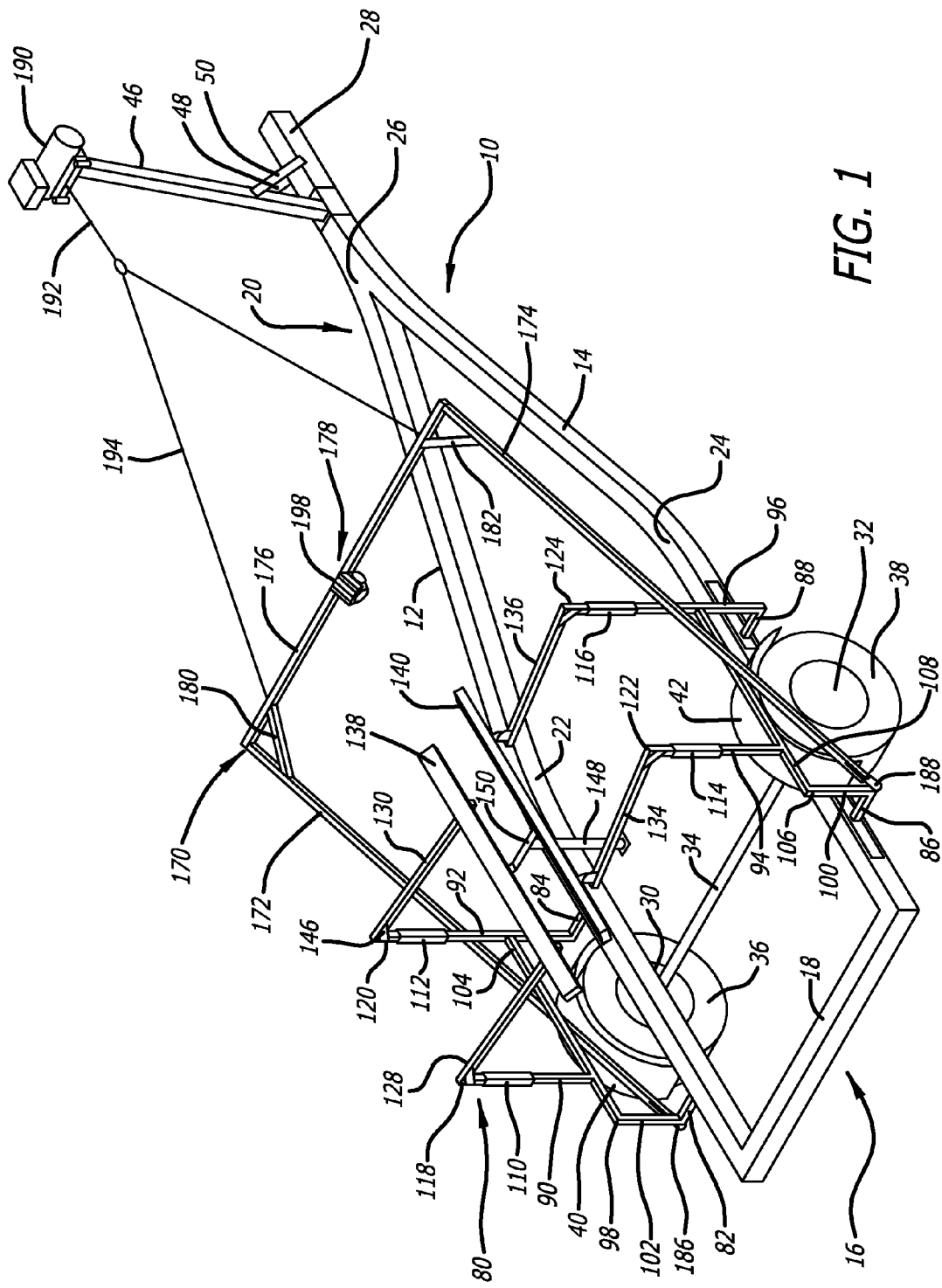
FIG. 1 is perspective view of an exemplary embodiment of the present invention without a boat or a personal watercraft mounted on the trailer.

The trailer of the present invention comprises a chassis. Chassis 10 of the exemplary embodiment is formed of rigid, strong material such as steel. Two side braces 12 and 14 (FIG. 1) form the sides of the chassis. The braces in the exemplary embodiment are generally parallel toward the rear 16 of the chassis. A rear brace 18 connects the two side braces. Toward the front 20 of the chassis, side braces 12 and 14 taper beginning at 22 and 24 and connect together at apex 26. A forward section 28 extends forward of the apex.

The exemplary embodiment of FIG. 1 shows a smooth transition at the apex between sidewalls 12 and 14. The sidewalls also could engage a short front brace, and the front projection 28 could extend from that front brace. Likewise, the exemplary embodiment shows curved transition at 22 and 24. The parallel and the tapering sections of the side supports could have sharper transition or could be formed of separate parts that are welded together.

In the exemplary embodiment, the side and rear braces and the front extension are welded together, but they could be fastened with mechanical fasteners or some other type of fastener. Though not shown in FIG. 1, intermediate braces may extend between side supports 12 and 14 to add rigidity and strength to the chassis.

Wheels 30 and 32 mount for rotation on axle 34. In the exemplary embodiment, the axel connects to the side walls 12 and 14. Although not show, leaf or coil springs and shock absorbers could connect the axel to the chassis. As is conventional, wheels 30 and 32 have rubber tires 36 and 38, respectively. Fenders 40 and 42 partially surround tires 36 and 38. Depending on the weight being carried, the trailer may have a second axel and set of wheels. Brake lines (not shown) extend to brakes at each wheel. In addition, the chassis may carry running and brake lights 54 (FIGS. 2–5) and the electric connections to the vehicle.

Post 46 is welded or otherwise attached to part of the front portion 28 of the chassis. Struts 48 and 50 secure post 46 in the position shown in the figures. Though not shown, the front end of front support 28 has structure for connecting to the trailer ball or other connector on a car, truck or SUV.

Figure 2:
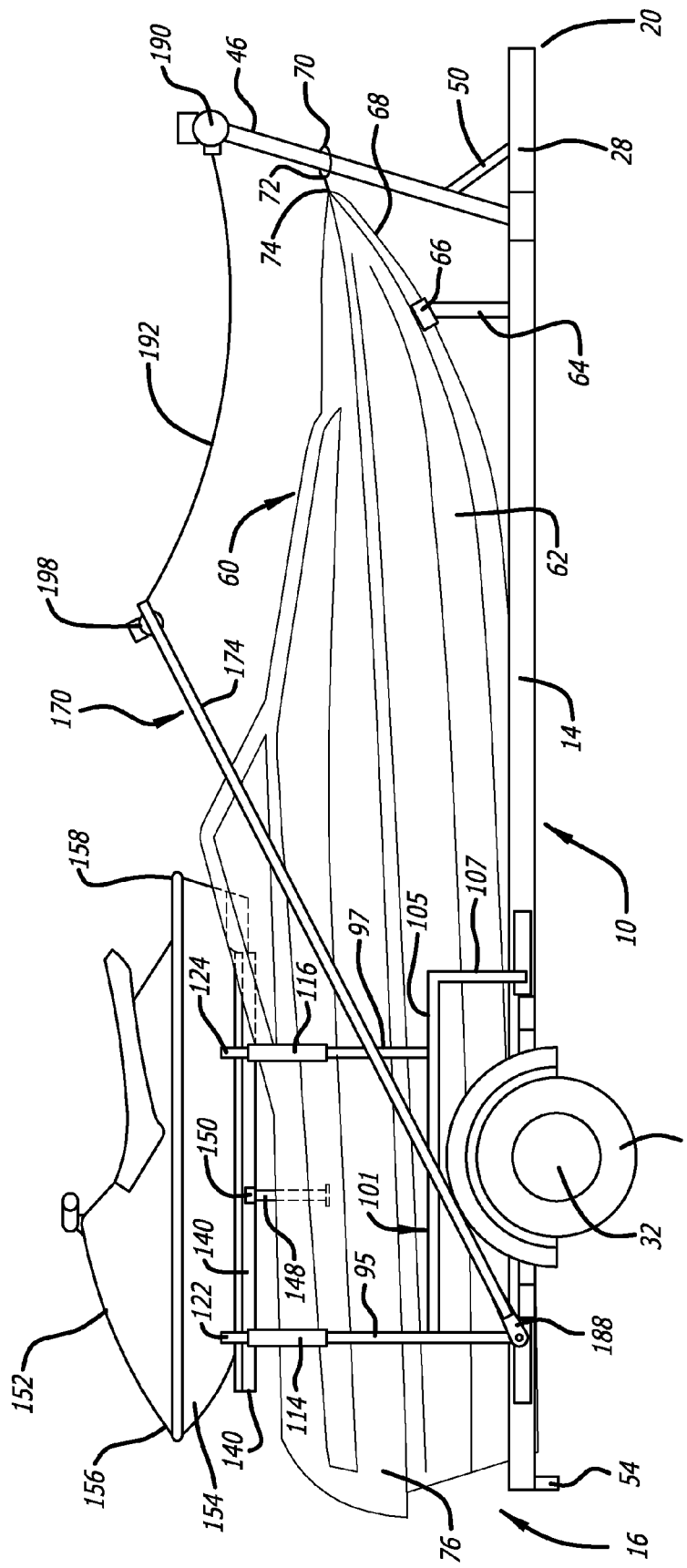
FIG. 2 is side elevation showing the personal watercraft mounted in a stored position on the trailer and above the boat.

The chassis also has supports (not shown) for a boat such as boat 60 (FIG. 2). These supports are of different designs depending on the shape of boat's hull 62. Note the support in Marteney, U.S. Pat. No. 5,704,756 (1998), which supports the deep hull of the boat pictured in that patent. For flatter hulls, the support or platform is closer to the chassis braces. Typically, the boat supports are long and wide enough to spread the force from the supports to the boat hull. The supports frequently are padded to avoid scratching or marring the hull's surface.

The exemplary embodiment also has an additional front support, which comprises a short post 64 with a cup 66 on top (FIG. 2). Post 64 extends upward from near the apex 26 of braces 12 and 14. It may also extend from a brace behind the apex. Alternatively a post assembly comprising two posts may attach to braces 12 and 14 behind the apex. The cup receives a rib 68 near the bow of boat 60.

A boat winch 70 mounts on post 46 (FIG. 2), and a cable 72 extends from the winch to a hook on the bow 74 of the boat. Boat winch 70 may be powered or hand cranked. Moreover, the winch may mount on its own post.

To launch boat 60, the vehicle driver typically backs down a boat ramp until the boat and part of the trailer are in the water. As the trailer continues down the ramp, the boat's buoyancy counteracts its gravitational force. Cable 72 is then let out of boat winch 70 to allow the boat to float backward into the water. When the boat is free of the trailer, the cable is unhooked from the bow hook and is retracted back into the winch. Thereafter, the vehicle pulls the trailer back up the boat ramp and out of the water. The driver typically parks the vehicle and trailer in an adjacent lot while the boat is in the water.

To return the boat to the trailer, the driver backs the vehicle and trailer down the boat ramp until the trailer is at least partially in the water. The boat is then driven or pushed onto the trailer. At some point, the cable extends to attach to hook 74. The winch then retracts the cable and helps pull the boat back into the position shown in FIGS. 2–5.

An elevated platform attaches to the chassis and extends above the chassis. In the exemplary embodiment, elevated platform 80 is preferably formed of steel braces. They may be galvanized or painted to avoid corrosion. Non-corroding materials such as aluminium, can be used, but steel is stronger. One could use stainless steel, but it is much more expensive than standard steel. The platform includes four horizontal bottom braces 82, 84, 86 and 88 (FIG. 1) that attach to the respective side braces 12 and 14. Vertical braces 90, 92, 94 and 96 extend upward from the horizontal braces. In the exemplary embodiment of FIG. 1 (FIGS. 2–5 are different), front braces 92 and 96 attach directly to their respective horizontal braces 84 and 88. However, rear vertical braces 90 and 94 extend upward from intermediate braces 98 and 100 (FIG. 1). Intermediate brace 98 is formed of a vertical brace 92 and a horizontal brace 104, and vertical brace 106 and horizontal brace 104 form intermediate brace 100. The principle vertical braces 90 and 94 extend upward from the horizontal portions of the intermediate brace 104 and 108.

The use of the short lower horizontal braces 82, 84, 86 and 88 position the vertical braces on the outside and out of contact with boat 60. If the elevated platform were to extend directly upward from chassis braces 12 and 14, they would occupy space that the boat takes up. Intermediate braces 98 and 100 add rigidity to the braces that form the elevated platform. Further, the intermediate brace allows proper spacing of the vertical braces 90 and 92 and 94 and 96 on each side of the chassis.

In the exemplary embodiment of FIGS. 2–5, rear braces 91 and 95 (only brace 95 is visible in the figures) attach directly to their respective horizontal braces (not visible on those figures). Front vertical braces 93 and 97 (only brace 97 is visible) extend upward from respective intermediate braces 98 and 101. Vertical brace 107 and horizontal brace 105 form intermediate brace 101.

Vertical braces 90, 92, 94 and 96 (FIG. 1) are adjustable vertically. The vertical braces on FIGS. 2–5 also adjust. Adjusters 110, 112, 114 and 116 in the FIG. 1 exemplary embodiment attach near the top of their respective vertical brace. The adjusters may be of the spring-mounted detent that allows short upper section 118, 120, 122 and 124 to adjust vertically.

The adjusters also allow removal of the short upper section and the structure that attaches to those sections. Upper horizontal braces 128, 130, 134 and 136 extend inwardly from the short vertical sections. A horizontal support 138 mounts at the inward end of upper horizontal arms 128 and 130, and another upper support 140 mounts on the inward end of upper horizontal supports 134 and 136. The upper supports may be mounted for pivoting to allow them to conform to the portion of the hull of a personal watercraft. The upper supports also may be padded to prevent scratching or marring of the hull's surface.

Though respective of braces must be strong enough to support the weight of a personal watercraft diagonal braces such as brace 146 (FIG. 1) may attach to adjacent braces near their intersection. In addition, an optional support post 148 may mount on the rear deck or elsewhere on the boat. The post preferably is adjustable and has an upper brace 150 that bears some of the weight of the personal watercraft.

FIG. 2 shows personal watercraft 152 mounted for transportation with boat 60. Hull 154 rests on supports 138 and 140 above the rear deck of boat 60.

Note that in the drawings bow 156 of the watercraft faces toward the stern 76 of the boat. Thus, when the watercraft is mounted off the stern of the boat in a manner discussed below, the watercraft enters the water bow first. Applicant believes that launching the watercraft stern first is equally good, and in some instances, may be preferable. The design of the components of the elevated platform can allow the platform to carry the watercraft with its bow or stern facing the stern of the boat.

A boom assembly mounts for pivoting relative to chassis 10. In the exemplary embodiment, boom assembly 170 comprises a pair pivoting boom arms 172 and 174 on either side of the chassis connected together by horizontal boom arm 176 at the distal end 178 of the boom assembly. Braces 180 and 182 (FIG. 1) extending between adjacent boom arms add rigidity to the boom assembly.

The proximal end 186 of boom arm 172 and the proximal end 188 of boom arm 174 attach for pivoting to the outside end of respective horizontal bottom braces 82 and 86 in the exemplary embodiment (FIG. 1). Many different types of hinges may allow pivoting. Moreover, proximal ends 186 and 188 could attach elsewhere to the chassis or to other braces of elevated platform 80.

Boom winch 190 mounts at the top of post 46. The exemplary embodiment shows a powered winch, but one could use a hand winch. The winch could mount directly to the post, or it could mount to a fitting that would allow the winch's removal for storage. For operation of the boom arm and launching of the personal watercraft by one person, having this winch and another winch described below operated by a remote controller may be desirable.

Boom winch 190 lets out and retracts cable 192. The distal end of the cable attaches to split cable 194, which in turn attaches to the ends of horizontal boom are 176 at the distal end 178 of the boom assembly. When the cable is in its fully retracted position (FIG. 2), the boom assembly 170 is in the stowed position shown in FIGS. 1 and 2, i.e., in its position closer to the bow of the boat and the front of the trailer.

Figure 3:
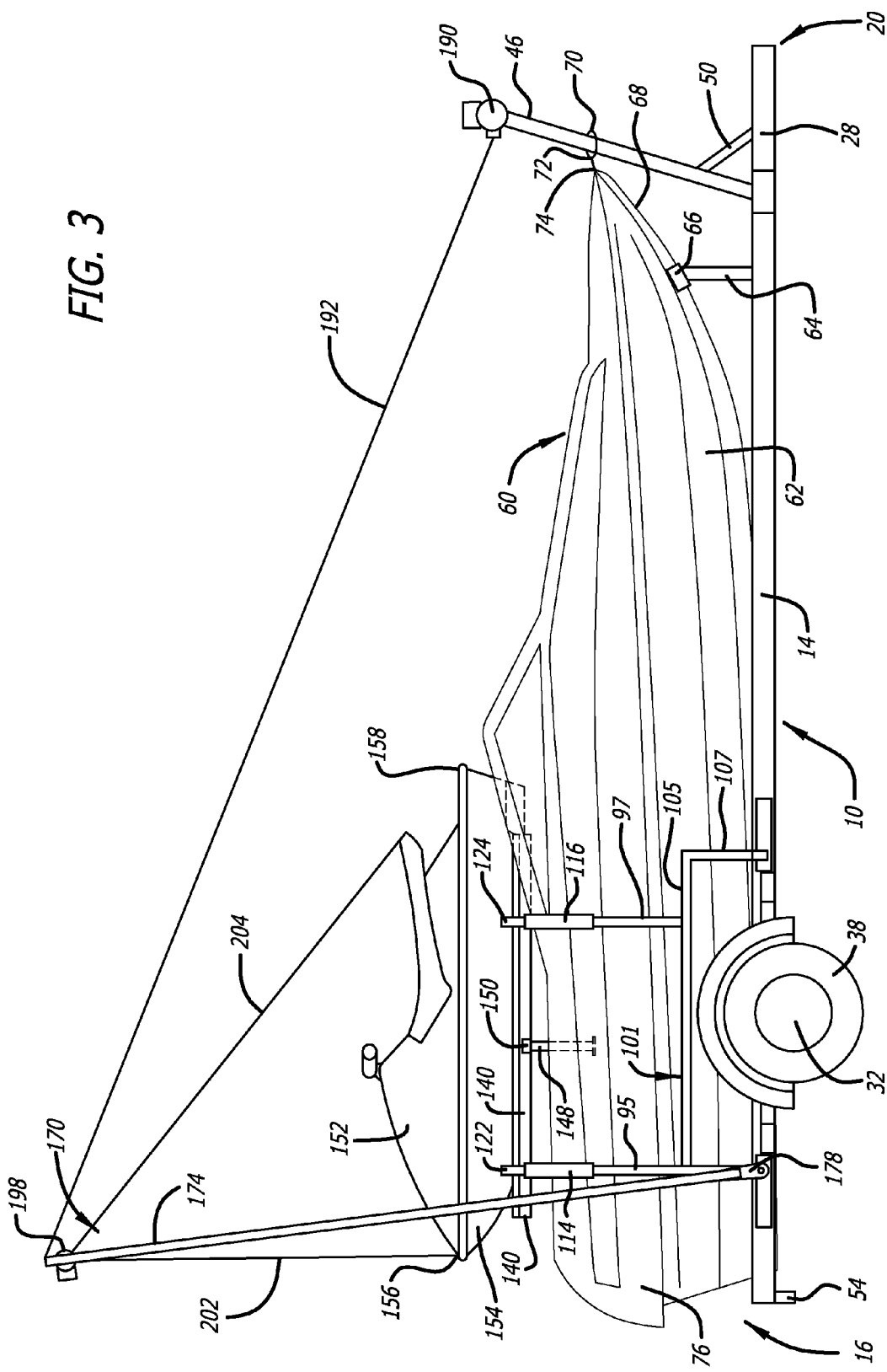
FIG. 3 is another side elevation of the trailer of the present invention showing the personal watercraft about to be lifted from the boat.
Figure 4:
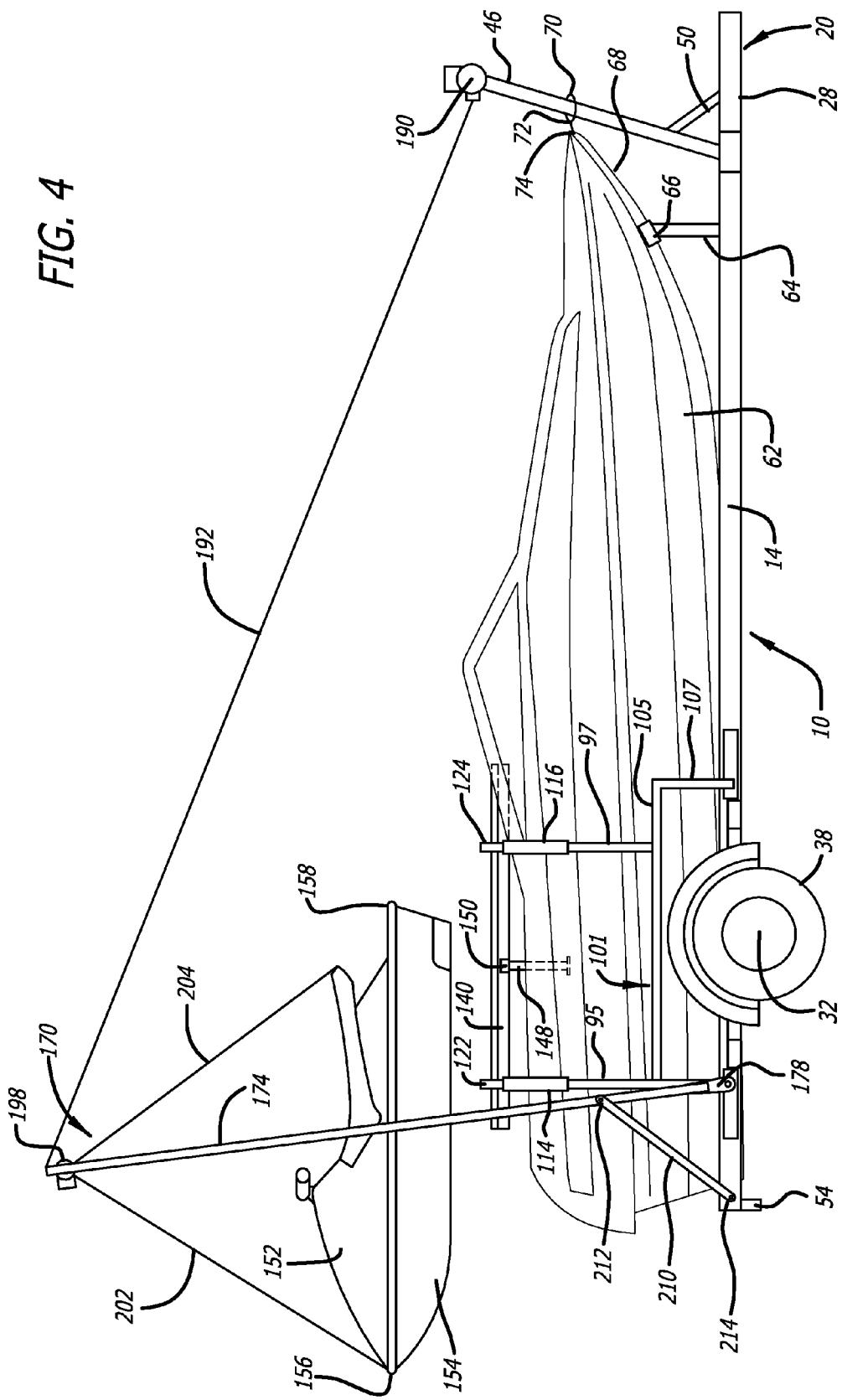
FIG. 4 is a side elevation of the trailer showing the personal watercraft freed from its support on the boat.

As boom winch 190 lets out cable 192, the boom assembly can pivot counterclockwise toward the stern of the boat. Except for the weight of the arms of the boom assembly and some associated components, the boom assembly light enough to allow a user to pivot the boom assembly manually as the cable is let out of the winch. In FIGS. 3 and 4, the boom assembly is in an intermediate orientation, slightly past vertical and its weight, even without manual force causes the boom assembly to continue pivoting counterclockwise.

Watercraft winch 198 mounts on horizontal boom arm 176. FIGS. 1–5 shows the winch fixed to the horizontal boom arm, but it could mount on a fitting that would allow the winch's removal for storage.

Cables 202 and 204 extend from watercraft winch 198 to watercraft 152. In the exemplary embodiment, cable 202 attaches to the bow 156 and cable 204 attaches near the stern. Although not visible in the elevation views of FIGS. 3, 4 and 5, cable 204, which attaches toward the stern, may be two cables to maintain port-starboard balance. Two cables also may attach near the bow. The cables may attach together and in turn attach to a single cable that the winch extends and retracts.

When the user positions boom assembly 170 in its intermediate position is near or slightly past vertical (FIG. 3), cables 202 and 204 are attached to watercraft 152. Watercraft winch 198 is then activated remotely to retract the cable or cables into the winch. The winch and cables then lift the watercraft off horizontal supports 138 and 140 of elevated platform 80. See FIG. 4.

Cables 192 and 194 that extend from boom winch 190 prevent further counterclockwise rotation of boom assembly 170 unless the winch lets cable out. However, with the boom assembly near vertical, a small force such as from a wind gust could push the watercraft to the right (FIG. 4). That could cause the boom assembly and the watercraft to move to the right quickly. Therefore, to prevent or limit such movement the present invention contemplates using a strut, chain, flexible strap 210 (FIG. 4) attached to fittings 212 and 214 on the chassis and vertical boom arm 174. A second strap could attach to the other side of the device.

When boom assembly 170 and watercraft 154 reach the FIG. 4 position, the user attaches strap 210 as shown. Because the exemplary strap is flexible, it bends to allow further counterclockwise pivoting of the boom assembly. However, cable 192 limits counterclockwise pivoting unless boom winch 190 is letting out cable.

Figure 5:
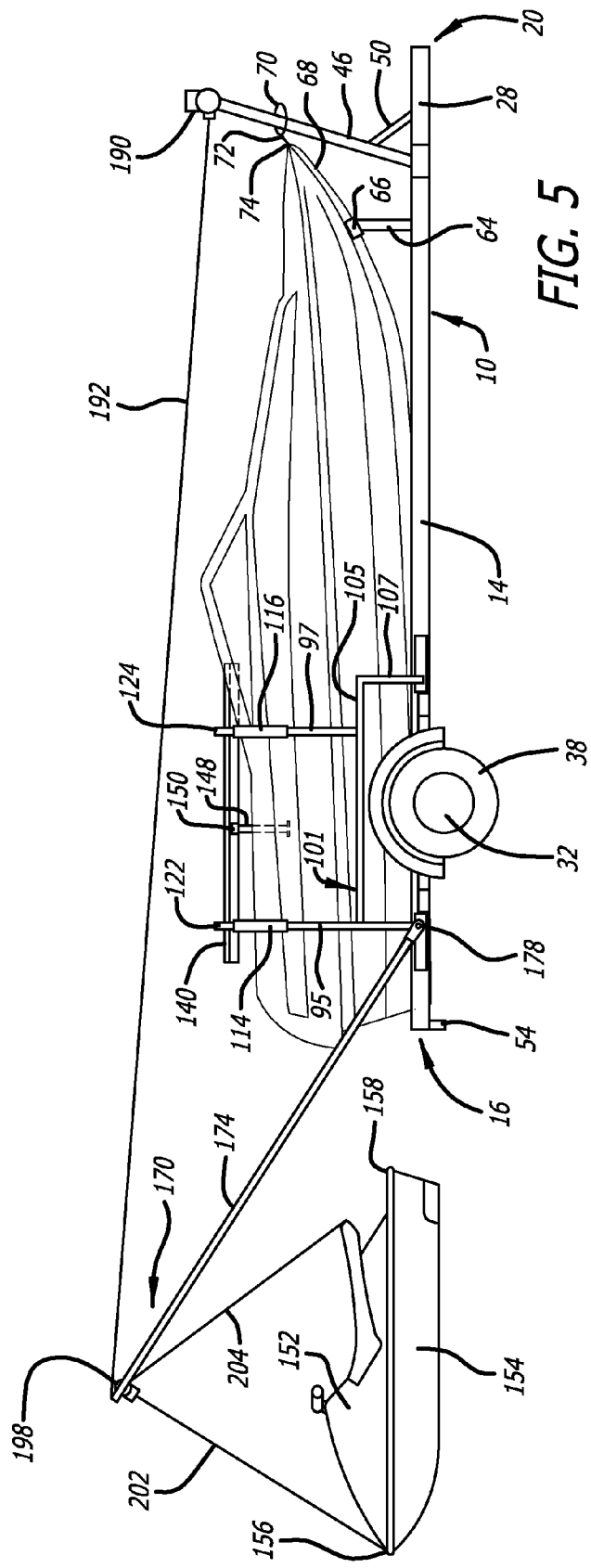
FIG. 5 is another side elevation showing the personal watercraft in a position where it can be launched or recovered.

FIG. 5 shows boom winch 190 letting out cable 192 for further counterclockwise pivoting of boom assembly 80 to its launch orientation. Eventually, watercraft 152 reaches the water where buoyancy counteracts the watercraft's weight. Cables 202 and 204 are slackened either by letting those cables out or by further counterclockwise rotation of the boom assembly toward the floating watercraft. Cables 202 and 204 are detached from the watercraft, and the operator drives the watercraft away. Boom winch 190 then retracts cable 192 to pivot boom assembly 170 clockwise to the FIG. 2 position.

If the user now wants to launch boat 60, he or she may have to raise or remove supports 138 and 140 of the elevated platform 80 so that the supports do not contact the higher parts of the boat. Adjusters 110, 112, 114 and 116 are provided for that purpose. The user also would remove or lay down post 148. Boat launch from the trailer is conventional.

The boat also can be removed without launching the watercraft. When the watercraft is in the FIG. 4 position, the user could raise or remove supports 138 and 140, and the boat could be launched under the watercraft. The user could then leave the watercraft in its FIG. 4 position, lower it back onto the elevated platform 80 or launch the watercraft. The user must be aware that post 148 normally extends from the boat to the watercraft and supports some of the watercraft's weight. The braces that form the elevated platform must be strong enough to support the watercraft without the post. In addition, if the watercraft is launched without the boat on the trailer, the trailer may have insufficient weight to counteract the weight and the lever arm of the watercraft and boom assembly. Consequently, the watercraft could flip the trailer counterclockwise. The trailer can be designed to avoid that problem. Alternatively, the attachment of the front of the trailer to the car, truck or SUV can prevent any such trailer movement.

Returning the watercraft to the trailer reverses the steps of launching the watercraft. Elevated platform 80 is returned to its supporting position and the post 148 is set upright on the boat. Boom assembly 170 is positioned in the launch orientation (FIG. 5). A user on or next to the watercraft attaches cables 202 and 204 to the watercraft with the watercraft's bow 164 or stern 166 facing the trailer. Watercraft winch 198 then retracts the cables to pull the watercraft out of the water. Boom winch 190 then retracts cable 192 to pivot the boom assembly clockwise toward the (FIG. 4) position. Watercraft winch 198 then begins lowering the watercraft. Boom winch 190 continues retracting cable 192. The combined motion gently drops to watercraft onto the horizontal support 138 and 140 of elevated platform 80. Strap 208 (FIG. 4) can be long enough to allow horizontal arm 176 of boom assembly 170 to be positioned properly over elevated platform 80 so that watercraft winch 198 can lower the watercraft onto the elevated platform.

After the watercraft is properly positioned, the operator allows cables 202 and 204 to go slack so that they can be released from the watercraft. Watercraft winch 198 than retracts any excess of cables 202 and 204. Strap 208 is released and boom winch retracts its cable 192 to pivot the boom assembly clockwise until the boom assembly returns to its stowed (FIG. 2) position. The user may hold onto the boom assembly to prevent it from falling into place.

Though the exemplary embodiment uses electric winches and cables, the ropes could replace the cables. Hand winches including sailboat winches can be used instead of electric winches. One also could use ropes and pulleys to move the boom assembly or watercraft. However, because of the weight of the watercraft, one may need a block and tackle or another arrangement that provides a mechanical advantage.

While the specification describes particular embodiments of the present invention, those of ordinary skill can devise variations of the present invention without departing from the inventive concept.

We claim:

1. A trailer for transporting and launching a boat and a personal watercraft comprising:
   a) a chassis having a front end adapted to be attached to a land vehicle;
   b) an elevated platform attached to and extending above the chassis and having a surface for supporting a personal watercraft;
   c) a boom assembly having a proximal end and a distal end, the proximal end being attached to the chassis outside the elevated platform, the boom assembly being pivotable from a stowed position in which the distal end of the boom assembly is above the boat to a launch position in which the distal end is beyond the periphery of the boat;
   d) a first winch operably attached to the chassis and having a first cable extending from the first winch to the boom assembly;
   e) a second winch on the boom assembly and having a second cable extending and attachable to the personal watercraft on the elevated platform;
   f) whereby letting out the first cable from the first winch allows a user to pivot the boom assembly from the first to the second position and whereby pulling the first cable into the first winch pivots the boom assembly from the second to the first position.

2. The trailer of claim 1 wherein the chassis has two sides and the boom assemble comprises a pair of arms, one on each side of the chassis, the boom assembly further comprising a connecting arm at the distal end of the boom assembly connecting the pair of arms together.

3. The trailer of claim 1 further comprising a boat post extending upward from the boat and contacting the watercraft when the watercraft is on the elevated support.

4. The trailer of claim 1 wherein the elevated support further comprises at least one adjuster for changing the position of portions of the elevated support relative to the chassis.

5. The trailer of claim 1 wherein portions of the elevated support are removable from the chassis while other portions of the elevated support remain attached to the chassis.

6. The trailer of claim 1 further comprising means extending between the chassis and the boom assembly for preventing pivoting of the boom assembly in at least one direction.

7. A trailer for transporting and launching a boat and a personal watercraft comprising:
   a) a chassis having a front end adapted to be attached to a land vehicle;
   b) an elevated platform attached to and extending above the chassis and having a surface for supporting a personal watercraft;
   c) a boom assembly having a proximal end and a distal end and being pivotable relative to the chassis from a stowed position in which the distal end of the boom assembly is above the boat to a launch position in which the distal end is beyond the periphery of the boat;
   d) first means attached to the boom assembly for controlling the pivoting of the boom assembly;
   e) second means extending from the boom assembly to the personal watercraft on the elevated platform for raising and lowering the personal watercraft relative to the boom assembly,
   f) whereby the boom assembly from the first to the second position and whereby pulling the first cable into the first winch pivots the boom assembly from the second to the first position.

8. The trailer of claim 7 wherein the chassis has two sides and the boom assembly comprises a pair of arms, one on each side of the chassis, the boom assembly further comprising a connecting arm at the distal end of the boom assembly connecting the pair of arms together.

9. The trailer of claim 7 further comprising a boat post extending upward from the boat and contacting the watercraft when the watercraft is on the elevated support.

10. The trailer of claim 7 wherein the elevated support further comprises at least one adjuster for changing the position of portions of the elevated support relative to the chassis.

11. The trailer of claim 7 wherein portions of the elevated support are removable from the chassis while other portions of the elevated support remain attached to the chassis.

12. The trailer of claim 7 further comprising means extending between the chassis and the boom assembly for preventing pivoting of the boom assembly in at least one direction.

13. A method of carrying a personal watercraft on a boat trailer and removing the watercraft from the trailer into water adjacent the trailer, the trailer having a chassis for carrying a boat; supporting the watercraft on an elevated platform above the chassis; pivoting a boom assembly on the chassis from a stowed position above the boat to an intermediate position above the boat and the support watercraft; lifting the watercraft off the elevated platform by means of cables attached to the watercraft and to a winch on the boom assembly; further pivoting the boom assembly and watercraft beyond the trailer to move the watercraft into the water.

14. The method of claim 13 wherein a cable extending between a winch on the chassis and the boom assembly pivots the boom assembly.

15. The method of claim 13 further comprising releasing the watercraft from the winch on the boom assembly when the watercraft is in or near the water.

16. The method of claim 13 further comprising blocking movement of the boom assembly when the boom assembly is in the intermediate position.

17. The method of claim 13 further comprising adjusting the position of at least a portion of the elevated platform when the watercraft is removed from the elevated platform.

* * * * *